Figure 1:
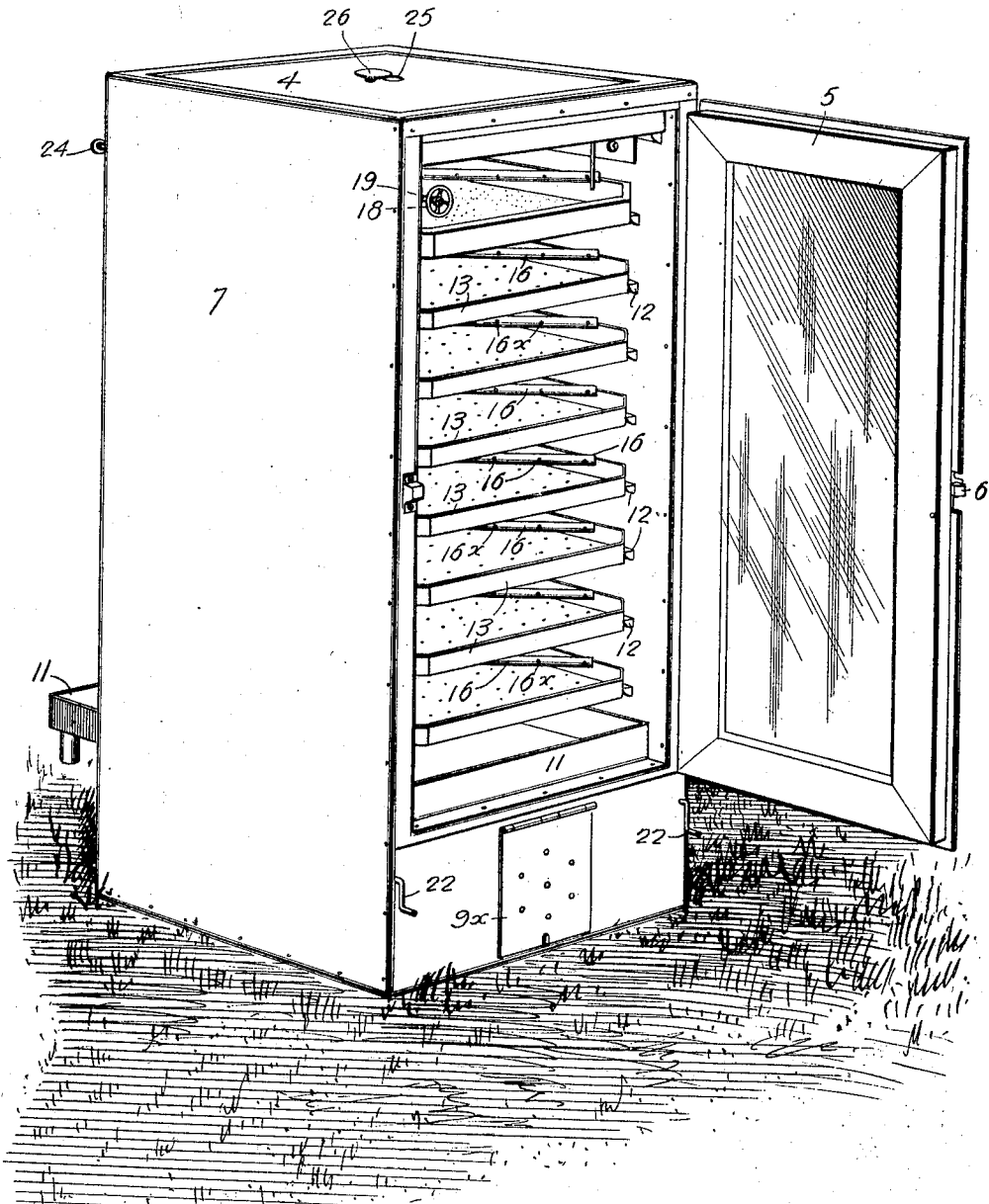

E. McFARLIN & A. CLINE.
APPARATUS FOR SPROUTING GRAIN.
APPLICATION FILED APR. 1, 1912.

1,038,407.

Patented Sept. 10, 1912.
3 SHEETS—SHEET 1.

WITNESSES

INVENTORS
ESCO McFARLIN
ASEL CLINE
BY
ATTORNEYS

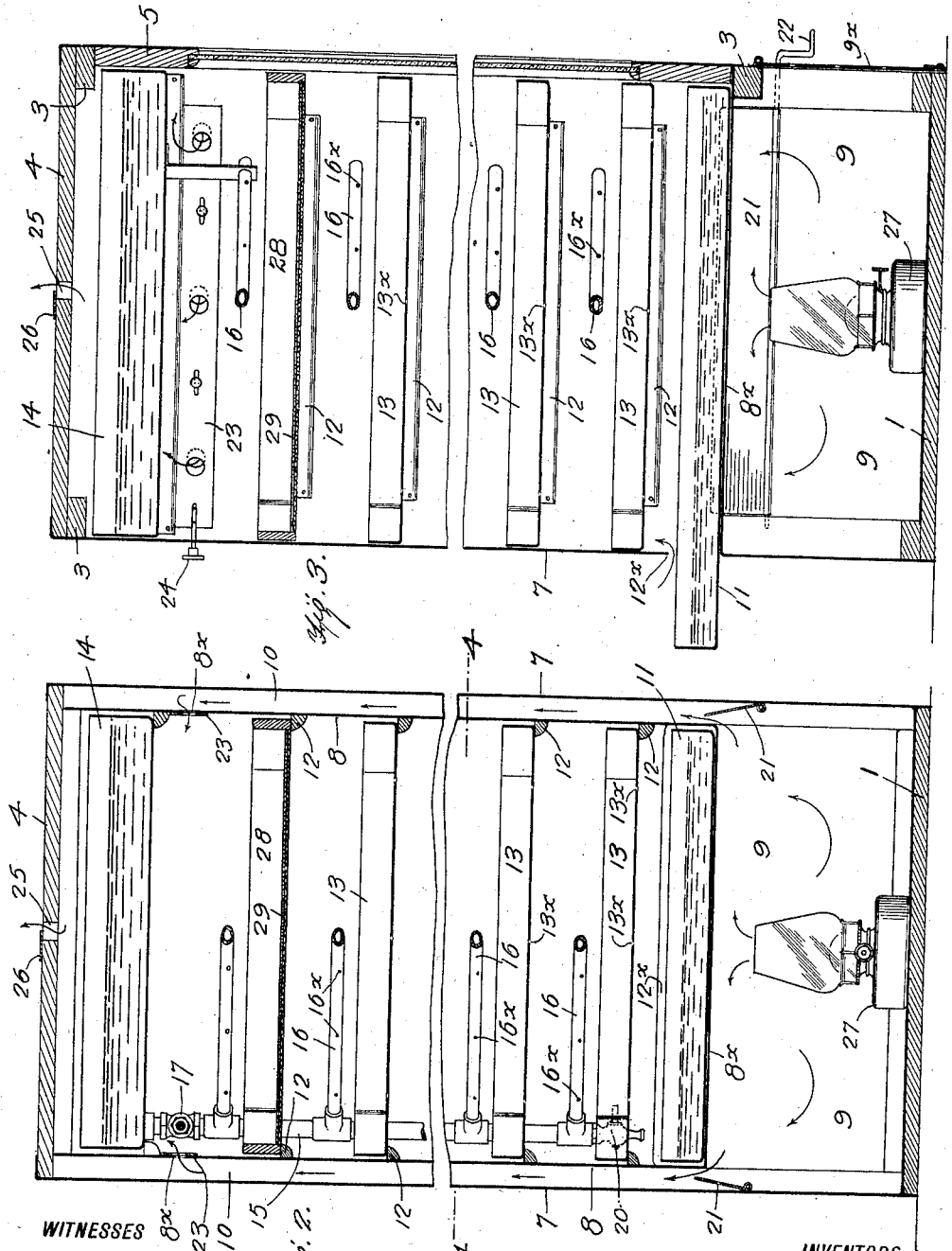

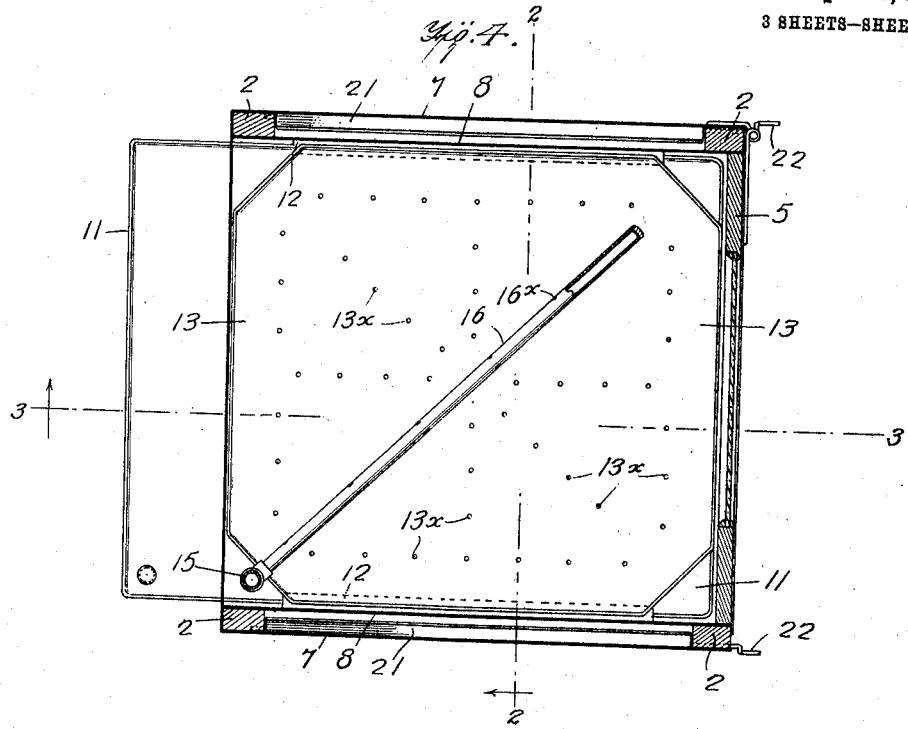
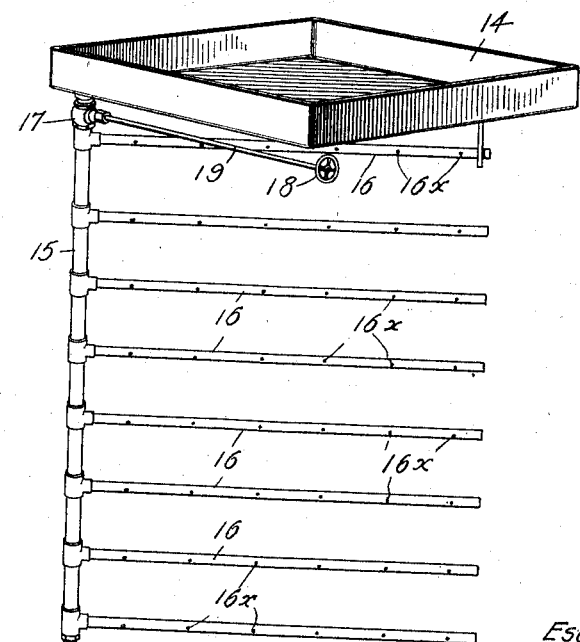

UNITED STATES PATENT OFFICE.

ESCO McFARLIN AND ASEL CLINE, OF DONIPHAN, MISSOURI.

APPARATUS FOR SPROUTING GRAIN.

1,038,407.  Specification of Letters Patent.  Patented Sept. 10, 1912.

Application filed April 1, 1912. Serial No. 687,643.

*To all whom it may concern:*

Be it known that we, Esco McFarlin and Asel Cline, citizens of the United States, and residents of Doniphan, in the county of Ripley and State of Missouri, have made certain new and useful Improvements in Apparatus for Sprouting Grain, of which the following is a specification.

Our invention relates to improvements in an apparatus for sprouting grain, and it consists in the combinations, constructions and arrangements herein described and claimed.

An object of this invention is to provide a simple inexpensive apparatus for sprouting grain, and by means of which the grain may be kept at the required temperature and can be supplied with moisture as desired.

A further object is to provide novel means for fertilizing seeds during the sprouting period, so as to obviate the necessity of mixing the fertilizer with the seed prior to the planting.

Other objects and advantages will appear in the following specification and the novel features of the invention will be particularly pointed out in the appended claims.

Our invention is illustrated in the accompanying drawings forming part of this application in which—

Figure 1 is a perspective view of the device, Fig. 2 is a vertical section through the device, along the line 2—2 of Fig. 4, Fig. 3 is a vertical section along the line 3—3 of Fig. 4, Fig. 4 is a horizontal section along the line 2—2 of Fig. 2, and Fig. 5 is a perspective view of the upper reservoir and the spraying device connected therewith.

In carrying out our invention we provide a frame consisting of a base member 1, corner uprights 2 (see Fig. 4) cross members 3 (see Fig. 3) and a top 4. This frame is preferably made of wood, although it may be made of any suitable material. A glass door 5 is provided having a latch 6. The frame thus formed is preferably lined on the outside with sheet metal such as sheet iron, as shown at 7, and is also provided with an inner lining 8 (see Fig. 2) extending from a heating chamber 9 up the sides of the device to the top 4. As will be seen from Fig. 2 the space between the outer and the inner linings 7 and 8 provide passages 10, for the warm air, as will be hereinafter explained.

The sheet metal linings 8 have an integral bottom member $8^\times$ which forms a support for a lower reservoir 11. This reservoir is slidable through an opening $12^\times$ in the outer sheet metal covering, one end of the reservoir being allowed to project beyond the body portion of the device as shown in Fig. 3.

Fastened to the inner sheet metal lining 8 above the lower reservoir is a series of cleats 12 which form supports for sliding trays 13, these trays being of the shape shown in Fig. 4, and being provided with perforations $13^\times$ in their bottoms. At the top of the device is an upper reservoir 14 which is connected by means of a downwardly extending pipe 15 with a series of spraying pipes 16 having perforations $16^\times$ to permit the spraying of the seeds. The pipe 15 is at one corner of the device and the pipes extend diagonally over the trays, as shown in Figs. 1 and 4. A valve 17 is provided for regulating the flow of water in the spraying pipe 16, the valve 17 being controlled by a hand wheel 18 attached to the valve stem 19 (see Figs. 1 and 4). The pipe 15 is provided at its lower end with a drain cock 20 which terminates above the lower reservoir 11.

At the junction of the heating chamber 9 with the air passages 10 are the dampers 21 which are pivotally mounted on crank rods 22. The forward ends of these rods are on the front of the device as shown in Fig. 1, and by turning these rods the dampers can be made to either close or open the air passages 10. In the walls 8 are openings $8^\times$, which may be closed by sliding dampers such as those shown at 23, manipulated by pull handles 24 at the rear of the device. The bottom heating compartment 9 is provided with a door $9^\times$ which is perforated to admit air.

From the foregoing description of the various parts of the device the operation thereof may be readily understood.

The tank or reservoir 14 is supplied with water through an opening 25, which may be closed by a pivoted plate 26. When the valve 17 and the stop cock 20 are open, the water may pass directly into the lower reservoir until it is sufficiently full, when the water may be shut off. A lamp 27 is placed in the heating chamber 9. The seeds are placed in the trays 13. Beneath the upper reservoir 14 is a tray 28 for fertilizer, this tray having a bottom 29 consisting of wire mesh covered with a fabric. The heat from the lamp passes up through the passages 10 and into the spaces between the fertilizer tray and the reservoir 14. The water in the upper reservoir is therefore heated. This heat may be regulated by means of the plate 26, and also by means of the dampers 21 and 23. When it is desired to supply moisture to the seeds it is only necessary to open the valve 17 by means of the hand wheel 18 when the water will run into the pipes 16 and will there be delivered to the seeds through the openings 16×. Furthermore the water which falls on the fertilizer (not shown) in the fertilizing tray will dissolve a portion of the fertilizer and carry it into the tray beneath it. This tray is perforated, as stated, and the fertilizer will continue on down. It will thus be seen that the seeds may be fertilized at any time during the sprouting process without the necessity of mixing the fertilizer prior to the beginning of the process.

Fresh air is supplied to the device through the opening 12× at the rear of the device just above the reservoir 11. The latter may serve as a drinking trough for chickens.

The glass door 5 supplies sufficient light for the sprouting plants, and when opened gives access immediately to the interior. When the water in the lower tank 11 is exhausted the valve 17 and the stop cock 20 may be opened to let the water from the upper tank pass directly to the lower reservoir without the necessity of putting cold water into the lower reservoir.

We claim:—

1. In an apparatus for sprouting grain, a casing provided with hot air passages at its sides, an upper and a lower reservoir within said casing, a series of slidable trays disposed between said upper and said lower reservoirs, means for controlling the flow of air through said passages, a pipe extending downwardly from said upper reservoir and terminating above said lower reservoir, a series of perforated pipes connected with said downwardly extending pipe, each pipe of said series extending over one of said trays, means for controlling the flow of water into said downwardly extending pipe, and a fertilizer tray disposed beneath said upper reservoir and being provided with a perforated bottom.

2. In an apparatus for sprouting grain, a casing provided with hot air passages between its side walls, an upper and a lower reservoir within said casing, said lower reservoir extending outside of said casing at the rear thereof, a series of slidable perforated trays disposed between said upper and said lower reservoirs, a pair of dampers at the lower ends of said passages for controlling the flow of air, a pair of dampers in the side walls near the upper ends of said passages for admitting air beneath said upper reservoir, a pipe extending downwardly from said upper reservoir and terminating above said lower reservoir, a series of perforated pipes connected with said downwardly extending pipe, each pipe of said series extending over one of said trays, a valve disposed in said pipe beneath said upper reservoir, a stop cock at the lower end of said pipe, and a fertilizer tray disposed beneath said upper reservoir and being provided wtih a perforated bottom.

ESCO McFARLIN.
ASEL CLINE.

Witnesses:
K. K. SHEMWELL,
E. C. THAXTON.

Copies of this patent may be obtained for five cents each, by addressing the "Commissioner of Patents, Washington, D. C."